Aug. 4, 1931. S. SCHISHKA 1,817,271
TOBACCO PIPE
Filed Dec. 7, 1926

Inventor
S. Schishka
by
W. E. Evans
Attorney.

Patented Aug. 4, 1931

1,817,271

UNITED STATES PATENT OFFICE

SIDNEY SCHISHKA, OF LONDON, ENGLAND

TOBACCO PIPE

Application filed December 7, 1926, Serial No. 153,126, and in Great Britain November 25, 1926.

This invention relates to tobacco pipes of the type in which means are provided in the hollow stem of the pipe for collecting the liquid that condenses and accumulates therein.

Pipes of the kind are known in which an extension of the mouthpiece extends within the bore of the pipe stem, and the invention has among its objects to provide simple and convenient means by which the parts of the extension may be separated for more effectively cleansing the extension from the accumulation of the liquid collected thereon, and for mounting within the extension a removable filter tube of an absorbent substance such as unsized or blotting paper.

According to the invention, an extension to the mouthpiece is provided comprising a channel or trough which is separable and is provided at its outer end with a removable tubular plug or fitting, so that thus the parts constituting the extension can be effectively cleansed.

The invention comprises the constructional features hereinafter described.

The invention is illustrated in the accompanying drawings in which

Figure 2:
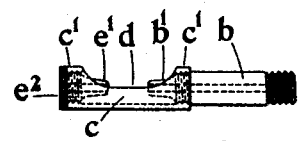
Figure 2 is a detail side elevation of the extension.
Figure 3:
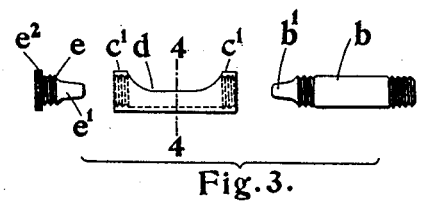
Figure 3 is a detail side elevation of the parts of the extension separated for the purpose of cleansing them after use of the pipe.
Figure 4:
Figure 4 is a detail cross-section on the line 4—4 Figure 3.

In carrying the invention into effect according to one construction, I provide the mouthpiece $a$ at the end at which it is connected to the pipe stem with an enlarged screw-threaded hole for the reception of the screw-threaded end of a connecting tube $b$ of metal such as aluminium or aluminium alloy, advantageously of small diameter and having a bore of the same diameter as that of the mouthpiece $a$ and in line with it, and this connecting tube $b$ is at its forward end provided with a screw-thread by which a channel or trough $c$ formed substantially as a metal tube cut out at its upper part at $d$ (Figure 2) may be mounted upon the connecting tube, there being an internal screw-thread at the respective ends of the channel or trough $c$ and these ends $c^1$ are advantageously completely circular. One end $b^1$ of the connecting tube $b$ may be tapered and may protrude at one end concentrically within the channel or trough $c$, while at the opposite end of the latter a hollow plug or fitting $e$ may be mounted, having an inwardly protruding conical end $e^1$ the plug or fitting being screw-threaded for engagement in the internal screw-thread at the outer end of the channel or trough $c$. The plug terminates in a flange $e^2$, which fits against the end of the trough, and this flange has a milled edge to facilitate unscrewing of the plug from the channel or trough $c$ which latter as will be understood is also capable of being readily unscrewed from the connecting tube $b$ carried by the mouthpiece $a$.

The channel or trough $c$ is advantageously made of tubing having a smooth outer and inner periphery and is cut away in a central position at $d$ so as to form at the middle a trough of a curved cross-section which is disposed at the lower part of the enlarged bore of the hollow pipe stem $h$.

Figure 1:
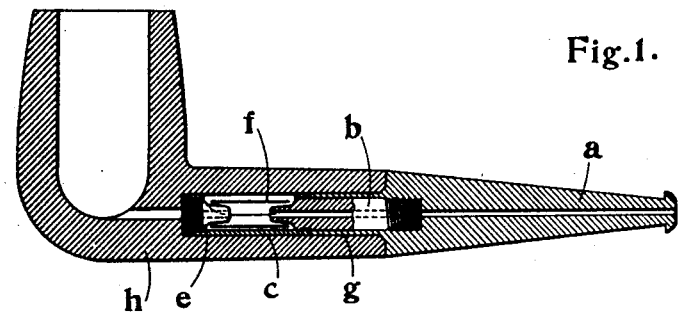
Figure 1 is a longitudinal section of a tobacco pipe according to the invention.

By such construction it is possible for a tube such as $f$ (Figure 1) of absorbent substance or unsized paper such as blotting paper to be applied within the channel or trough $c$, the tube for this purpose being of a diameter slightly less than that of the internal diameter of the channel or trough $c$ and of such a length that while the tube may be mounted with its ends over the inwardly protruding ends $b^1$, $e^1$ of the connecting tube $b$ and of the plug $e$, the tube $f$ shall not fit upon the inwardly protruding ends $b^1$, $e^1$ but be so disposed that annular spaces are left between, through which the smoke may pass.

By such means a perfectly dry smoke may be ensured, but the use of a tube of absorbent substance may be dispensed with.

By such construction, it is possible for the extension to be provided with a receptacle for the condensed liquid, and for the parts to be readily separated to facilitate effective cleansing.

The mouthpiece $a$ is advantageously provided with a sleeve comprising an inwardly protruding and reduced part $g$ of an external diameter corresponding to the external diameter of the channel or trough $c$, so that thus the channel or trough $c$ may be continuous with the sleeve $g$ of the mouthpiece $a$ that passes into the hollow stem of the pipe. Thus the stem of the pipe may be provided with a bore of uniform diameter within which the channel or trough $c$ and the sleeve $g$ of the mouthpiece fit, so that by such means the smoke passing through the pipe passes through the plug $e$ at the outer end of the channel or trough, thence into the channel or trough $c$, and thence through the end of the connecting tube $c$ which is carried by the mouthpiece, and thence through the mouthpiece $a$. The connecting tube $b$ extends entirely through the sleeve and is threaded into the body of the stem at the rear of the sleeve, as shown.

It will be understood that the respective tion. The hub of the carrier 16 is also protube $b$, the channel or trough $c$ and the plug $e$ may be provided of the same metal or material advantageously aluminium or aluminium alloy, and that an indicating mark may be applied upon the mouthpiece to indicate the upright position of the channel or trough $c$ with reference to the hollow stem $h$ of the pipe.

It will furthermore be understood that instead of providing the respective parts of the extension of metal, they may be provided of glass, vulcanite or any other solid substance capable of being moulded or formed for connection together in the manner described.

I claim:

In a tobacco pipe, a hollow stem, a mouthpiece having a part of reduced diameter, constituting a sleeve, fitting within one end of said stem, a trough cylindrical at the ends and semi-cylindrical in its central portion and of uniform internal diameter throughout, said trough fitting within the stem and having internally threaded ends, a connecting tube the body of which is of approximately the same external diameter as the inner diameter of the trough and externally threaded, said tube extending through said sleeve and threaded into the mouthpiece at the rear of the sleeve and into one end of the trough and having an end of reduced diameter projecting into the trough, and a perforated plug threaded into the opposite end of the trough, said plug terminating in a flange at one end, which fits against the said opposite end of the trough, and having its opposite end of reduced diameter and projecting into the trough.

SIDNEY SCHISHKA.